US009998639B1

(12) United States Patent
Bhattacharya et al.

(10) Patent No.: US 9,998,639 B1
(45) Date of Patent: Jun. 12, 2018

(54) CONDUCTING AUTONOMOUS EXPERIMENTS IN SPACE

(71) Applicant: The United States of America as Represented by the Administrator of the National Aeronautics and Space Administration, Washington, DC (US)

(72) Inventors: Sharmila Bhattacharya, Los Altos, CA (US); Terry Clay Lusby, Mountain View, CA (US); Chetan Angadi, San Jose, CA (US); Siddharth Pandey, Canberra (AU)

(73) Assignee: The United States of America as Represented by the Administrator of the NASA, Washington, DC (US)

( * ) Notice: Subject to any disclaimer, the term of this patent is extended or adjusted under 35 U.S.C. 154(b) by 62 days.

(21) Appl. No.: 15/268,187

(22) Filed: Sep. 16, 2016

Related U.S. Application Data

(60) Provisional application No. 62/221,570, filed on Sep. 21, 2015.

(51) Int. Cl.
*H04N 7/18* (2006.01)
*H04N 5/225* (2006.01)
*H04N 5/232* (2006.01)
*G02B 17/08* (2006.01)
*H04B 7/185* (2006.01)

(52) U.S. Cl.
CPC .......... *H04N 5/2252* (2013.01); *G02B 17/08* (2013.01); *H04B 7/18515* (2013.01); *H04N 5/2253* (2013.01); *H04N 5/2254* (2013.01); *H04N 5/23241* (2013.01); *H04N 7/181* (2013.01)

(58) Field of Classification Search
CPC .. H04N 5/2252; H04N 5/2253; H04N 5/2254; H04N 5/2256; H04N 2005/2255; H04B 7/18515
USPC .............................................. 348/207.99, 374
See application file for complete search history.

(56) References Cited

U.S. PATENT DOCUMENTS

| 3,687,110 | A | * | 8/1972 | Braunhut | ............. | A01K 67/033 |
| | | | | | | 119/421 |
| 4,448,150 | A | * | 5/1984 | Catsimpoolas | ...... | A01K 29/005 |
| | | | | | | 119/455 |
| 5,531,185 | A | * | 7/1996 | Asano | ..................... | C30B 30/08 |
| | | | | | | 117/206 |

(Continued)

OTHER PUBLICATIONS

Bioserve Space Technologies—Supporting High-Impact Space Life Science Research; 2 Pgs, http://www.colorado.edu/engineering/Bioserve/ retrieved Aug. 28, 2016.

(Continued)

*Primary Examiner* — Ngoc-Yen Vu
(74) *Attorney, Agent, or Firm* — Meredith K. Blasingame; Robert M. Padilla; Mark P. Dvorscak

(57) ABSTRACT

A device for conducting scientific experiments in space has a housing having dimensions of about 100×100×150 mm or smaller. Within the housing is an electronic processor, a camera, and a chamber for containing living or non-living test subjects. A mirror is positioned next to the chamber so that the camera lens can view both a face of the chamber, and the mirror, which reflects a side of the chamber. The chamber can additionally include sensors and a fan controlled by the processor to change conditions within the housing based upon sensor data.

20 Claims, 9 Drawing Sheets

(56) References Cited

U.S. PATENT DOCUMENTS

| | | | | |
|---|---|---|---|---|
| 8,884,768 | B2* | 11/2014 | Alsaffar | G08B 21/00 27/31 |
| 9,128,032 | B2* | 9/2015 | Carson | A61B 5/0059 |
| 9,196,052 | B1* | 11/2015 | McIntyre, II | G08B 13/19656 |
| 9,497,928 | B2* | 11/2016 | Garner | A01K 29/005 |
| 2016/0270364 | A1* | 9/2016 | Woolf | A01K 1/031 |
| 2017/0208652 | A1* | 7/2017 | Luckhardt | H05B 6/6447 |

OTHER PUBLICATIONS

CubeSat—Origin of the New Space Revolution—CubeSat Desgin Specification; 3 pgs, http://www.squarespace.com retrieved Aug. 26, 2016.

NanoLabs—The Operating System of Space—Begin Your Journey Here; 2 pgs—http://www.nanoracks.com/sitemap/retrieved Aug. 8, 2016.

Marshall Space Flight Center—NASA-EXPRESS rack 4 and 5 fact sheet (Jul. 1); 2 pgs—http://www.nasa.gov/centers/marshall/news/background/facts/express4-5html,—retrieved Aug. 8, 2016.

Techshot—Innove. Integrate. Inspire.—Multi-Purpose Variable-Gravity Platform (MVP); 2 pgs—www.techshot.space,, retrieved Aug. 28, 2016.

Techshot Aerospace—Innove. Integrate. Inspire.—A Legacy of Success; 2 pgs—http://www.techshot.com/aerospace/index.php, retrieved Aug. 28, 2016.

Techshot—TS-G874-DS-1010, Interface Definition Document (IDD) for the *Drosophila* Experiment Module for the Multi-purpose Variable-g Platform (MVP); 2 pgs—dated Aug. 14, 2015.

* cited by examiner

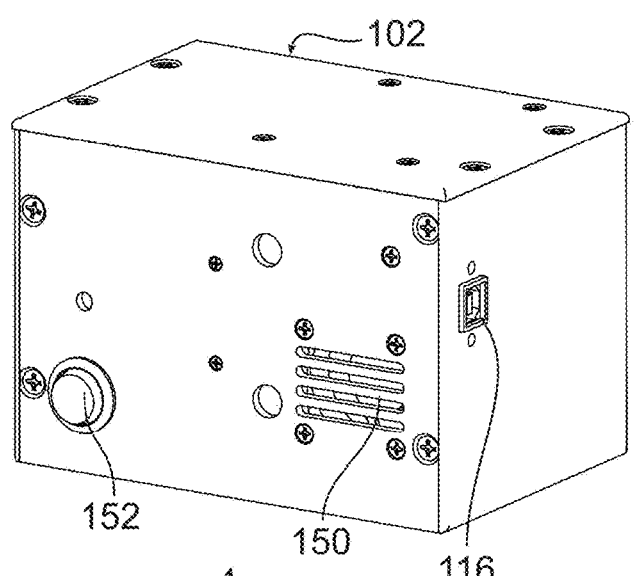
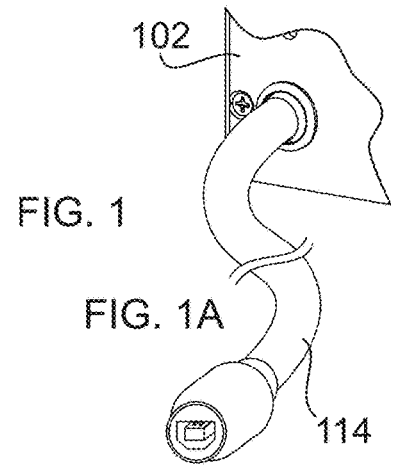
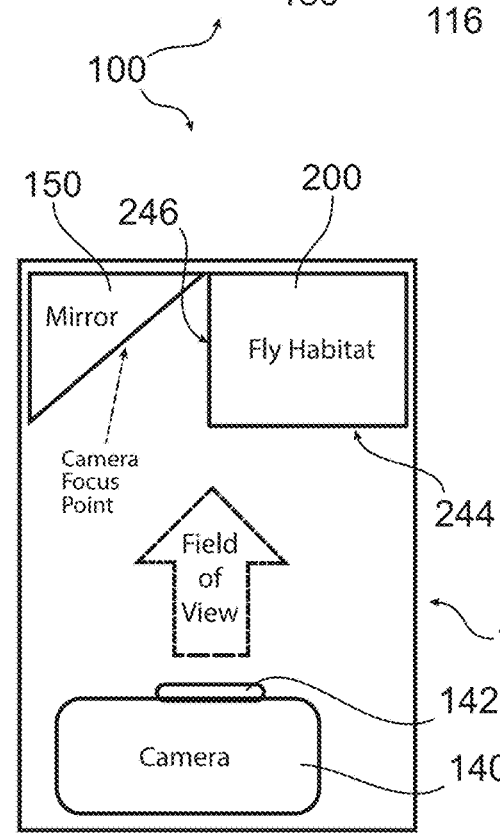
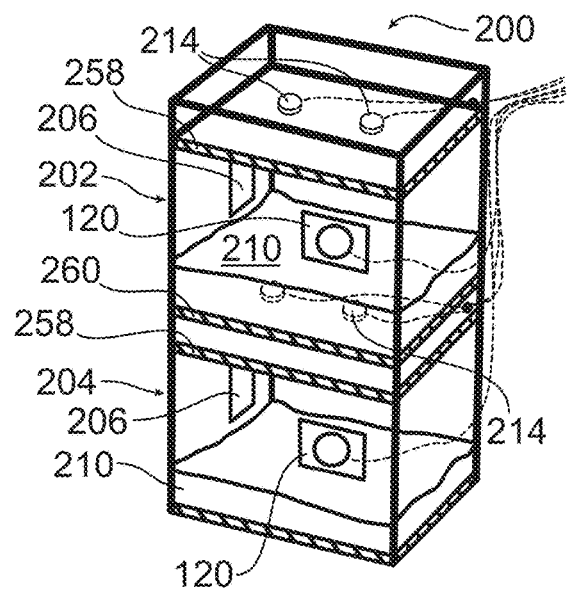
FIG. 1
FIG. 1A
FIG. 2
FIG. 3

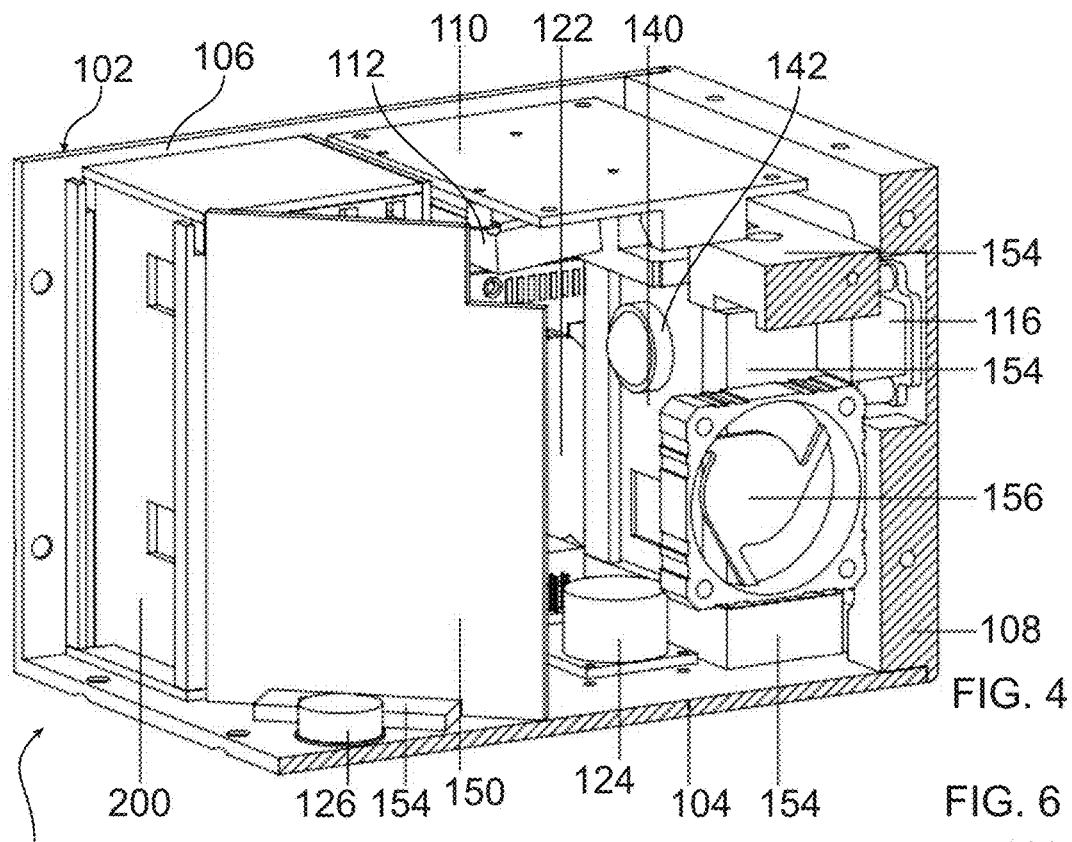
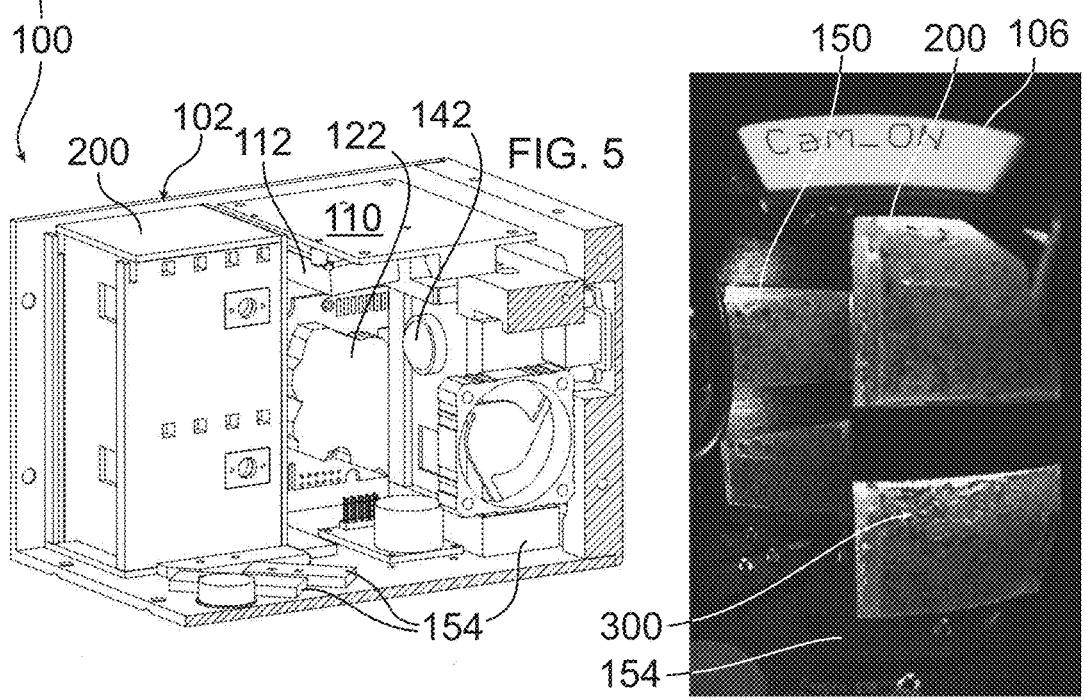
FIG. 4
FIG. 5
FIG. 6

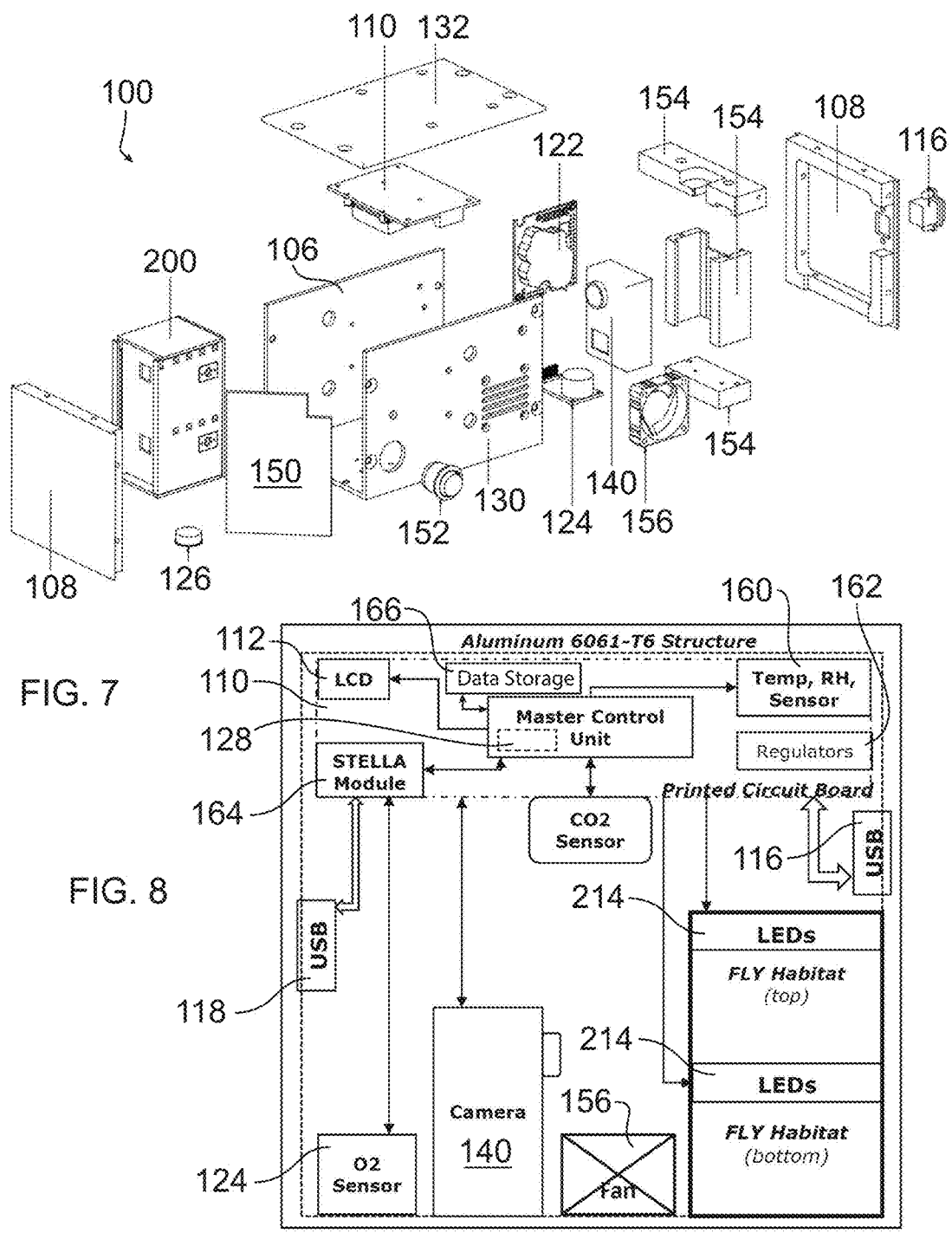

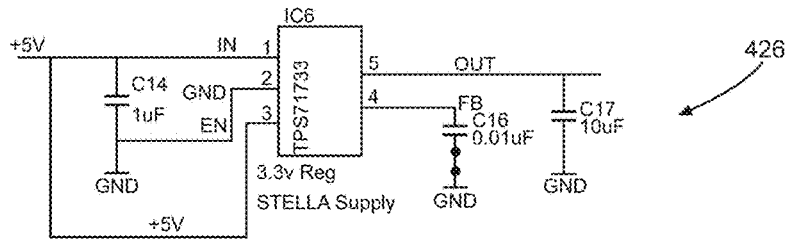
FIG. 10C
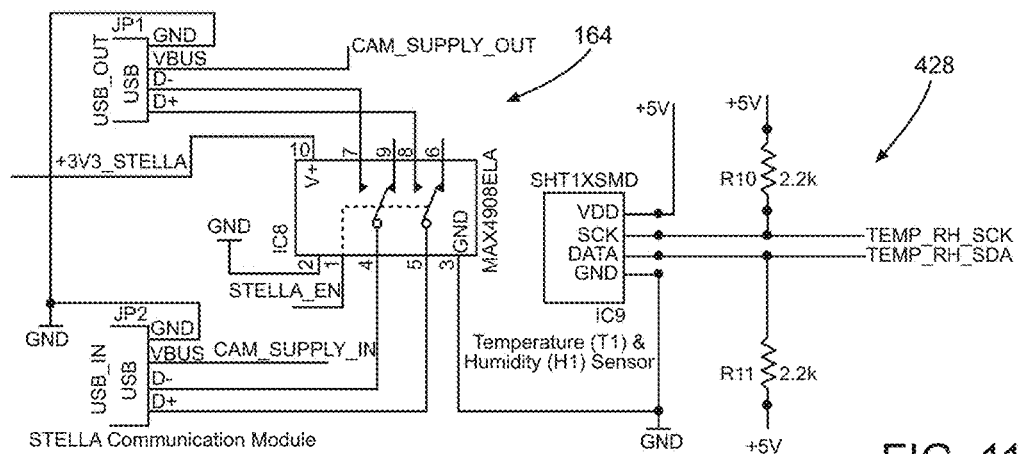
FIG. 11
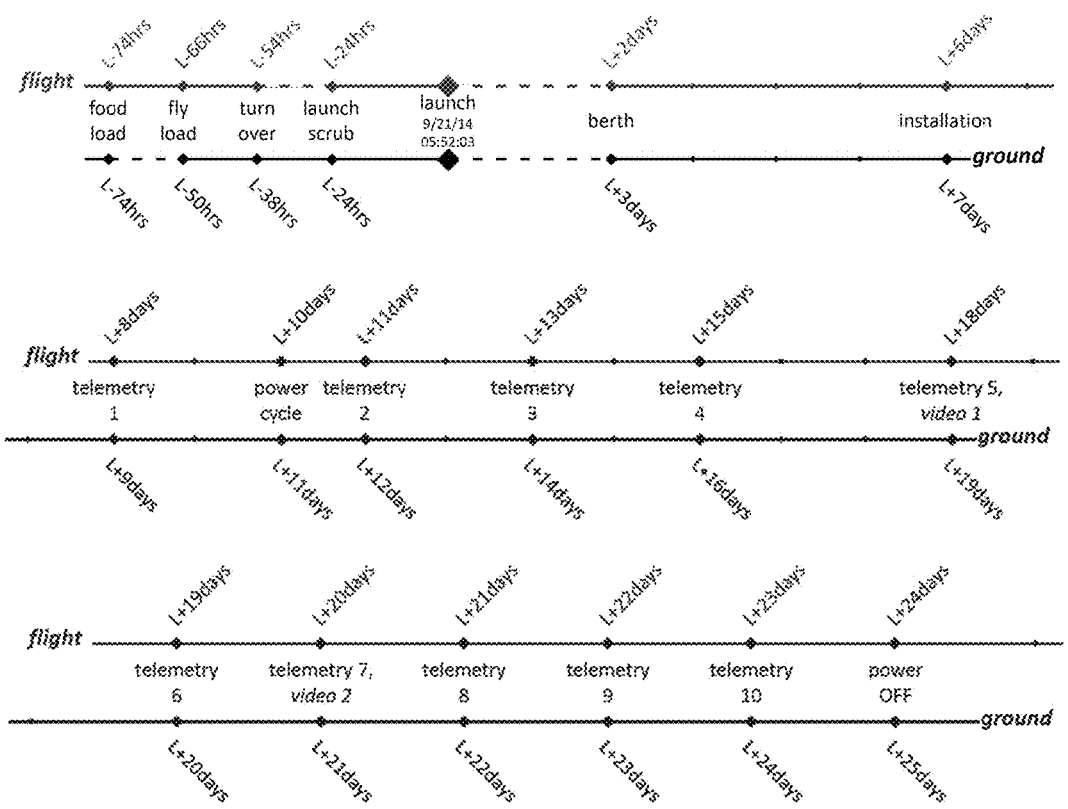

… (US 9,998,639 B1)

CONDUCTING AUTONOMOUS EXPERIMENTS IN SPACE

CROSS REFERENCE TO RELATED APPLICATION

This application claims the benefit of U.S. Provisional Patent Application No. 62/221,570, filed on Sep. 21, 2015. The subject matter of the U.S. Provisional Patent Application is incorporated herein by its entirety.

ORIGIN OF INVENTION

The invention described herein was made in the performance of work under a NASA contract and by (an) employee(s) of the United States Government and is subject to the provisions 51 U.S.C. § 20135(b), Public Law 111-314, § 3 (124 Stat. 3330, 51 U.S.C. Chapter 201), and may be manufactured and used by or for the Government for governmental purposes without the payment of any royalties thereon or therefore.

BACKGROUND OF THE DISCLOSURE

NanoRack Platforms, manufactured by NanoRacks LLC of Webster, Tex., are installed within the International Space Station (ISS). The platforms are designed to accommodate articles based upon the CubeSat form factor, which are multiples of 10 cm cubed, with a 1 U unit size being 10×10×10 cm.

NanoLab payloads fit within the NanoRack Platform, and may include electronic circuit boards, and can include a video camera and sensors, powered by a USB connection. NanoLabs are reportedly available in 1 U, 1.5 U, 2 U, 4 U, and 2 by 4 U sizes.

The EXPRESS Rack is a standardized payload rack system that transports, stores and supports experiments aboard the International Space Station. EXPRESS stands for EXpedite the PRocessing of Experiments to the Space Station. Each EXPRESS Rack is housed in an International Standard Payload Rack (ISPR), a refrigerator-size container that acts as the EXPRESS Racks' exterior shell. Each rack can be divided into segments, whether as large as half the entire rack or as small as a breadbox. The first two EXPRESS Racks installed have eight middeck locker-sized locations and two International Subrack Interface Standard (ISIS) drawer locations each.

SUMMARY OF THE INVENTION

In an embodiment of the disclosure, a device for conducting scientific experiments in space comprises a housing having dimensions of about 100×100×150 mm or smaller, the housing containing an electronic processor; at least one chamber for containing one or more of at least one of a living or non-living subject of the experiment, the chamber having a first side and an adjacent second side; a fan controllable by the electronic processor; a mirror; and a camera controllable by the electronic processor, the camera including a lens oriented to directly view both the chamber first side and the mirror, the mirror oriented to reflect the chamber second side to the lens.

In variations thereof, the mirror is positioned at about a 45 degree angle with respect to the chamber second side; images recorded by the camera depict movement of the subject within the at least one chamber along an x-y axis in stored images of the first side, and along a z axis in stored images of the second side, whereby the stored images of the first and second sides can be processed to determine 3 dimensional movements of the subject; the at least one chamber and the camera are positioned at opposite ends of the longest dimension of the interior of the housing; the processor, fan, and camera operate using 5 volt power derived from a USB connection; the device further includes lights which emulate daylight and lights which emit infrared light, the lights controlled by the processor to illuminate an interior of the chamber in a circadian pattern emulating day and night; and/or the housing further includes a circuit configured for transmitting data through a STELLA interface (Satellite Tool-kit Ethernet Lab Like Architecture, developed by the Boeing Company), and wherein the scientific experiment is carried out using 5 W or less by powering the STELLA interface, camera, lights, fan, and sensors singly or in groups, as controlled by the processor.

In other variations thereof, the lights, fan, and camera operated simultaneously consume more than a maximum amount of power available, and are controlled by the processor individually or in groups to maintain a total power consumption within the amount of power available; there is no significant source of power storage within the housing; the infrared lights use less power than the daylight lights, and wherein the camera is operated longer during the night portion of the circadian pattern, the processor controlling the IR lights to illuminate only during use of the camera; the device has an overall dimension of 1 U; the device further includes a STELLA communications interface connected to the processor; the device further includes a plurality of sensors electronically connected to the processor and configured to measure parameters inside the housing including at least one of temperature, oxygen saturation, and carbon dioxide saturation, and to provide sensor data pertaining to the measured parameters through the electronic connection to the processor; the fan is controlled by the processor based on the sensor data; and/or surfaces inside the housing are covered with a non-reflective material.

In another embodiment of the disclosure, a method for conducting scientific experiments in space, comprises providing a housing having dimensions of about 100×100×150 mm or smaller, the housing containing an electronic processor; at least one chamber for containing one or more of at least one of a living or non-living subject of the experiment, the chamber having a first side and an adjacent second side; a mirror; and a camera controllable by the electronic processor, the camera including a lens oriented to directly view both the chamber first side and the mirror, the mirror oriented to reflect the chamber second side to the lens.

In variations thereof, the housing further includes a STELLA communications interface, and a fan controllable by the processor; the housing further includes lights which emulate daylight and lights which emit infrared light, the lights controlled by the processor to illuminate an interior of the chamber in a circadian pattern emulating day and night; and/or the infrared lights use less power than the daylight lights, and wherein the camera is operated longer during the night portion of the circadian pattern, the processor controlling the IR lights to illuminate only during use of the camera.

In another embodiment of the disclosure, a device for conducting scientific experiments in a space vehicle, comprises a housing having dimensions of about 100×100×150 mm or smaller, the housing containing an electronic processor; at least one chamber for containing one or more of at least one of a living or non-living subject of the experiment, the chamber having a first side and an adjacent second side; a fan controllable by the electronic processor; a plurality of sensors operative to communicate data pertaining to the environment within the housing to the processor; a STELLA interface connected to the processor and a communications system of the space vehicle, for transmitting data away from the space vehicle and back to the space vehicle; a mirror; and a camera controllable by the electronic processor, the camera including a lens oriented to directly view both the chamber first side and the mirror, the mirror oriented to reflect the chamber second side to the lens.

BRIEF DESCRIPTION OF THE DRAWINGS

The accompanying figures, where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 1 depicts a perspective view of a module of the disclosure, and particularly the housing;

FIG. 1A depicts the module of FIG. 1, with a USB cable in place of a power switch;

FIG. 2 is a perspective view of a habitat for test subjects, including upper and lower chambers;

FIG. 3 depicts a top diagrammatic view of the interior of the housing;

FIG. 4 is a perspective view of the housing of FIG. 1, with housing sides removed so that an interior of the module can be viewed;

FIG. 5 is the view of FIG. 4, with the mirror removed;

FIG. 6 is a depiction of a portion of the field of view of the camera, showing a view through an angularly disposed mirror adjacent the habitat, and a frontal view of the habitat, with an LCD screen within the field of view above the habitat;

FIG. 7 is an exploded view of the module of FIG. 1;

FIG. 8 is a diagrammatic view of the components within the module of FIG. 1, showing interconnections between components;

FIG. 10A-10C are various example circuits useable within the module of FIG. 1;

FIG. 11 is a timeline depicting events associated with staging, launch, deployment, and retrieval of a module of FIG. 1 deployed both upon the ground and in the ISS;

DETAILED DESCRIPTION OF THE INVENTION

Figure 9:
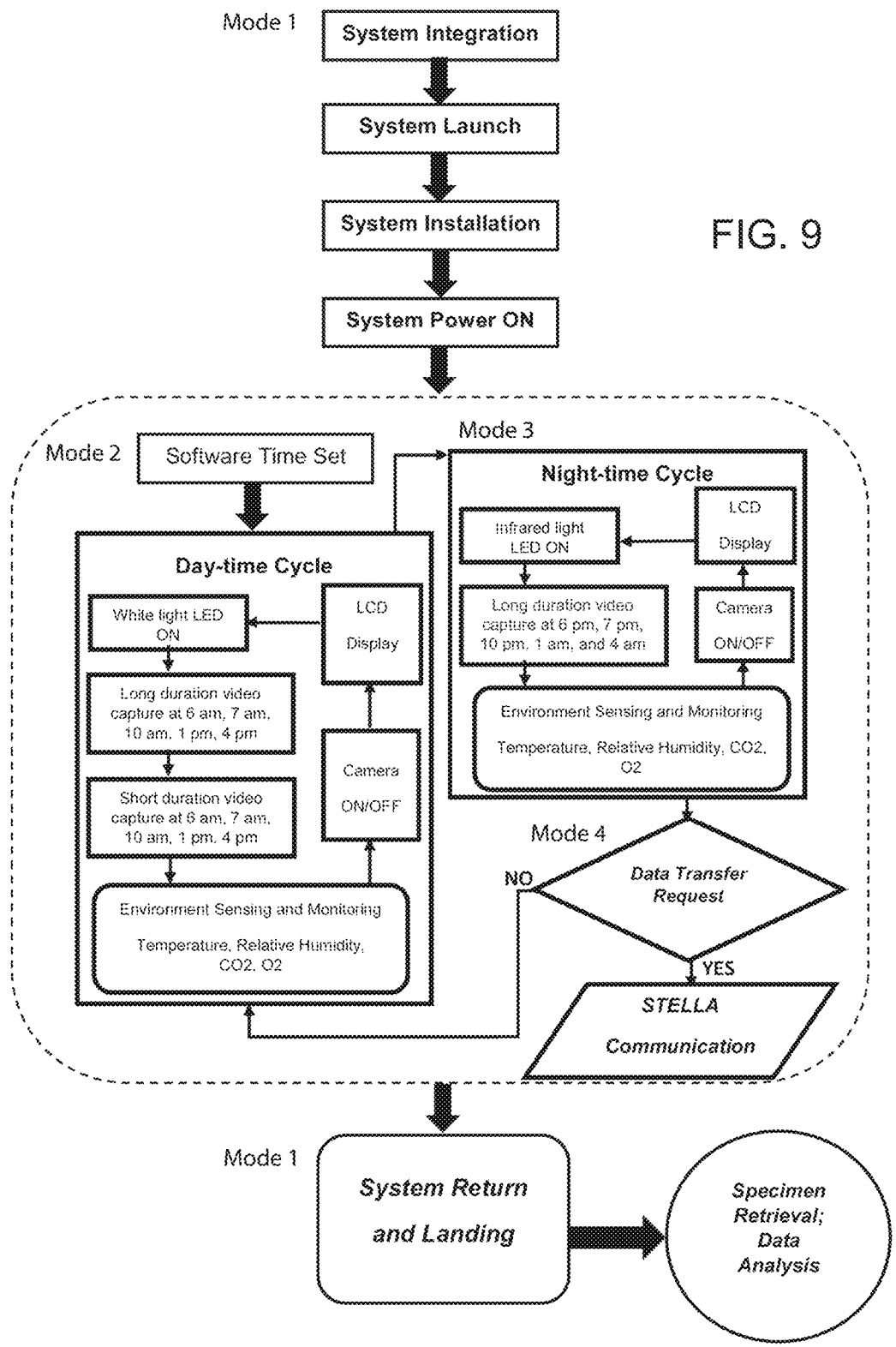
FIG. 9 is a flow diagram of the various modes of operation of the module of FIG. 1, from launch staging to retrieval, in an experiment including a circadian lighting pattern.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The figures herein are drawn for ease of understanding, and are not drawn to scale or proportion.

In accordance with the disclosure, a compact science experiment module 100 includes an enclosure or housing 102 that can house a complete scientific experiment which can include detailed monitoring of living biological materials or test subjects 300 (FIG. 6), such as insects or plants, or non-living sample materials. Module 100 includes a capability of automated operation for autonomous or partially autonomous operation. As described further herein, components are included for supporting the biological samples, environmental parameter sensing, monitoring, and logging; video imaging; timed lighting; air circulation; and data storage, download, and communication.

Module 100 is particularly adapted for transport aboard the International Space Station (ISS), or other space vessel, in which crew time is either not available, or is extremely limited for attending to science payloads. Accordingly, the disclosure provides for valuable scientific experimentation with a minimal expenditure of time or training for the ISS crew. More particularly, module 100 may be pre-positioned and electrically connected prior to launch, or may be positioned and electrically connected after launch by crew, while requiring no further attention for the remainder of the mission, or until module 100 is to be returned to ground.

Once positioned and electrically connected to the ISS, experiments may run autonomously using onboard computer programming within module 100, with data provided using real-time, near real-time, or scheduled telemetry. Additionally, telemetry can provide for communicating instructions from ground stations for making adjustments to the experiment during the mission. FIG. 1A is a breakaway view of FIG. 1, in which a USB cable 114 replaces switch 152, the USB cable connectable to the racking system within the ISS. In a further embodiment, there is both switch 152 and cable 114. FIG. 7 is an exploded view of FIG. 1.

Module 100 is additionally particularly adapted to functioning aboard the ISS due to being dimensioned for smaller uniformly sized spaces which tend to be more readily available aboard the ISS, as the small size renders the spaces more difficult to exploit. Specifically, the ISS is equipped with racking adapted to accept modules which have an exterior dimension of 1.5 U or 1 U, or 10 cm×10 cm×15 cm and 10 cm×10 cm×10 cm, respectively. These dimensions also correspond to CubeSat dimensions, which are in multiples of 1 U. Other similarly small dimensions can be provided in accordance with the disclosure; however these particular dimensions have become standard sizes. Accordingly, in an embodiment, module 100 has either a 1.5 or 1 U exterior dimension, with allowed tolerances. As such, module 100 consumes a minimal amount of space aboard the ISS. The existing racks, which can include racks manufactured by NANORACKS of Webster, Tex., include connections for communication and power, which are exploited by module 100 as described herein.

The disclosure may be implemented to about a 1 or 1.5 U size. For example, tolerances can be less than 1%, or up to 10%, whereby module 100 can be 99 mm×99 mm×148 mm, or as small as 90 mm×90 mm×135 mm or as large as 110 mm×110 mm×165 mm for a 1.5 U size, with similar adjustments made for a 1 U housing. The disclosure can additionally be carried out with a housing that is substantially smaller than a 1 U size, for example as smaller rack slot sizes are introduced. For example, the disclosure can be carried out with a housing 102 that is one-half or one-quarter the size of the current 1 U standard, or a substantially smaller size than $\frac{1}{4}^{th}$ U.

An example habitat 200 for living biological test subjects is depicted in FIG. 2, and is secured within module 100. In the embodiment shown, upper and lower chambers 202, 204 are provided for housing two separate populations, or separate test and control populations. It should be understood that habitat 200 could form a greater or lesser number of chambers, and alternatively, the chambers can be provided for holding separate samples of any type. Further, the chambers can be positioned side by side or in any other relative orientation.

In the example shown, the test subject is fruit fly larvae, and a suitable feed medium 210 is placed within the chamber. Due to the eventual presence of low gravity, a feed medium which forms a cohesive mass is advantageous, in this case for example a mixture of banana, sugar, oatmeal, and yeast, although the medium is selected for the particular organism being studied.

A sealable portal 206 is provided in each chamber, through which the media and organisms or samples may be introduced. The seal can be a filter configured to enable the passage of metabolic gases, but not liquids or the test subjects themselves. Generally, the seal is configured to prevent unwanted contamination of the ISS with the test subject material. The individual chambers can be otherwise sealed to maintain a controlled testing environment.

One or more sensors 120 can be positioned upon a surface or through the surface of each chamber, for measuring a desired test condition within the chamber. Examples of conditions which may be tested include temperature, light, pressure, sound, salinity or the presence of other chemicals, vibration, or any other environmental parameter. Lighting elements 214, for example LED lights, are positioned in each chamber, to provide circadian or other light pattern for living test subjects, or to otherwise illuminate a chamber for photo or video capture.

With reference to FIG. 3, it may be seen that habitat 200 is positioned within module 100. To capture photographs or video of the organisms within habitat 200, a camera 140 is positioned proximate an opposite end of module 100. To provide for the widest field of view, for example a full width of module 100, camera 140 and habitat 200 are positioned at opposite ends of the longest dimension of module 100. In an embodiment, a commercially available camera is used, but the lens of the camera is replaced with a higher quality commercial lens. More particularly, lens 142 is selected to maximize the field of view, adjust focal length, improve IR sensitivity and minimize distortion.

Due to the small dimensions of module 100, there is sufficient space for only a single camera with the desired capabilities in terms of speed, resolution, programming features, and storage capacity. In accordance with the disclosure, a mirror 150 is used to enable a single camera to capture both a front view 244 of habitat 200, as well as a side view 246. In an embodiment, mirror 150 is disposed at an angle of about 45 degrees with respect to a side surface of the habitat, adjusted in either direction to place a side view of the habitat within the field of view of lens 142. In this manner, video obtained from the camera can enable determination of a flight pattern of the test subjects in three dimensions. The focus point of the lens is thus advantageously about the middle of mirror 150, and likewise a midpoint of habitat 200, with a depth of field sufficient to capture the furthest and closest portions of mirror 150 and habitat 200 with sufficient focus. Use of a single camera further enables a reduced weight, cost, and complexity of module 100.

Referring now to FIG. 4, module 100 includes a housing 102 having a top, side, and back plate removed so that internal components can be seen. Housing 102 is advantageously fabricated with a light and strong material, such as aluminum, although other materials can be used provided they conform to the safety requirements of the ISS. In particular, a printed circuit board (PCB) 110 includes an integrated liquid crystal display (LCD) 112. Board 110 includes a microcontroller or electronic processor 128 (diagrammatically illustrated in FIGS. 8 and 10B) and software, and can connect to on-board and off-board sensors 120, such as a temperature sensor and a humidity sensor within, for example, an IBUTTON device 126 (of Maxim Integrated Products, Inc., San Jose, Calif.). Board 110 can function as a master control unit for module 100, as described elsewhere herein. Herein, sensor 120 represents any device which can communicate data pertaining to a sensed or measured condition within the housing to the processor.

Additionally positioned within housing 102 are a diffusion based carbon dioxide sensor 122, a diffusion based oxygen sensor 124, an air circulation fan 156, a USB interface 116 for connecting to the ISS, and a power switch 152 (FIG. 1). Housing 102 lower, back, and side panels 104, 106, and 108 are additionally visible in FIG. 4. Housing braces 154 are provided as attachment points and stabilization to ensure module 100 is sufficiently robust for all phases of the mission.

FIG. 5 corresponds to FIG. 4; however mirror 150 is removed for better visualization of interior components of module 100, particularly including housing 200 and CO2 sensor 122. It may further be seen that LCD 112 is within the field of view of lens 142, and its output can be viewed in photographs or video captures of camera 140. It may additionally be seen that the lower, back, and front, 104, 106, and 130 of housing 102 are integrally formed from a single sheet of material, to which side panels 108 and a top panel 132 are attached.

FIG. 6 illustrates a portion of the field of view of camera 140, where at right, the front view 244 of the habitat is visible, including upper chamber 202 and lower chamber 204. Fly larvae can be seen distributed throughout each chamber. At left, mirror 150 can be seen, as well as a side view 246 of the upper and lower chambers 202, 204. As such, an x-y axis of movement of each organism can be observed directly at right, and a z axis of movement can be observed through the mirror. These motions can be combined to produce a 3 dimensional movement pattern of individual organisms within each chamber. It may further be seen that each chamber is illuminated by lighting elements 214.

With additional reference to FIG. 2, in an embodiment, a light diffusing panel separates lighting elements 214 from each chamber 202, 204 to more evenly distribute light within each chamber. To generate an equal amount of light within each chamber, an opaque panel 260 can be positioned above lighting elements positioned between chambers 202, 204. To further reduce reflections, glare, or bright/'hot' spots which could otherwise obscure details within a photo or video, the interior surface of housing 102, housing braces 154, and other objects within the housing are coated or painted with a dark and/or non-reflective material, for example black paint or anodizing. The inventors have found by reducing hot spots, the camera sensor will not be oversaturated; and therefore the subject can be exposed to less light while still obtaining an acceptable image.

FIG. 8 diagrammatically illustrates the foregoing components, and further illustrates that PCB 110 includes a processor 128 functioning as a master controller, a sensor interface circuit 160, a voltage regulator and power control circuit 162, and an interface or controller for LCD 112. PCB 110 additionally includes a STELLA interface 164 which enables communicating to the ground and through the Internet using standard IP addressing. The STELLA module 164 interfaces to a USB interface 118 which is connected to the racking system within the ISS.

In addition to controlling communication over STELLA and through a panel USB interface 118, processor 128 accepts input from, and/or issues commands to, sensors 120, camera 140, fan 156, lighting elements 214, and any motors or other actuators (not shown) provided within housing 102.

Referring to FIGS. 8 and 9, which are a system block diagram and an operational flow chart respectively, various operating modes of an embodiment of the disclosure may be understood.

Mode 1: Launch and Landing. During this phase, the completely assembled and integrated system is waiting for launch and is largely in a passive phase with all elements powered down except, in the example of the fruit fly experiment, the iButton device, which is measuring and logging temperature and relative humidity data at preprogrammed intervals. The model organism specimens are enclosed within habitat 200, and an adequate airflow is enabled through portal 206, which can include a mesh size small enough to prevent escape of larvae or flies, but large enough to enable sufficient airflow.

Mode 2: Day-time Experiment. This mode begins as soon as module 100 is installed in its respective locker and is plugged into the power and communications interface, for example using USB, and is turned on by pressing power switch 152. In an embodiment, power switch 152 is not needed, and processor 128 boots and initiates activity once powered by the USB connection. In daytime mode, lighting elements including daylight or white light, such as white LEDs, are illuminated within each chamber 202, 204, and processor 128 sets a timer clock to a predetermined time which will correspond to a notional 'sunrise', for example 6 am. Generally, however, lighting elements 214 can be programmed to accommodate different durations of white and IR lighting, as needed.

Using sensor data, processor 128 operates fan 156 at various speeds which help foster values for humidity, oxygen, carbon dioxide, and humidity which are healthful for the organism being studied. One or more of the sensors 120 provide such appropriate data to processor 128, and either logging occurs within the sensor, or processor 128 provides logging, as needed for the experiment. LCD 112 can further display various data values which can be captured by camera 140 for evaluation by ground crew during the mission, or which can be studied later.

Camera 140 begins photographic or video capture at predetermined time points as determined by software stored on non-volatile memory on board PCB 110. Additionally, or alternatively, via communication using STELLA, ground crew can initiate or modify operation of devices such as camera 140 and fan 156, or other actuators if provided. Mode 2 continues until the timer clock reaches a night time-point, in this example 6 pm relative to the start time of 6:00 am.

Lighting elements 214, PCB 110, sensors 120, and the living organisms all produce heat. In addition, humidity is created due to the metabolism of the organisms (including microorganisms) and the presence of food. Further, metabolic gases are produced, and oxygen is consumed. Due to the very small confines of housing 102, a microclimate is thus created which may otherwise deviate considerably from optimal conditions for the experiment. Accordingly, fan 156 is controlled by processor 128, in a closed loop system together with sensors 120. When any of temperature, oxygen saturation, carbon dioxide saturation, or relative humidity fall outside of desired programmed values, fan 156 can be operated in a binary or speed controlled fashion until the one or more values are brought within specification by air introduced from the larger climate of the interior of the ISS (or ground station). In this manner, sensors 120 may be monitored by processor 128 in an intermittent or continuous manner, for example as power is available, to prevent excessive deviation from desired environmental parameters.

As noted elsewhere herein, module 100 can operate entirely using the amount of power available through a single USB connection. More particularly, due to the strict power budgeting requirements of the ISS, a peak of 2.5 or 5 W is available at any given time. Moreover, batteries cannot be used as they are potential hazardous cargo. Accordingly, there is no significant buffer for managing briefly increased or overlapping power demands from multiple devices. In accordance with the disclosure, an experimental system configured for a circadian rhythm uses daylight or white lights during the day portion of a daily cycle, and uses no such lighting during the nighttime portion of the daily cycle. As such, additional power is available at 'night' for other tasks, such as telemetry, including transmitting data from the previous day. While the camera can be operated during the night as well as the day, lighting can be used only while photo or video capture is taking place, to reduce power consumption. Moreover, reduced power infrared lighting can be used to avoid disturbing the circadian rhythm, as IR is invisible to the flies and other organisms. Additionally, sensors and actuators, as well as the camera, can be operated serially as needed to maintain a peak power demand below 5 W at all times.

During Mode 2, long and/or short duration video can be captured at predetermined time points, balancing power demand of the sensors and the continuous demand of the daytime lighting.

Mode 3: Night-time Experiment. This mode begins at the end of Mode 2 with habitat 200 intermittently illuminated by IR LEDs, for photo or video capture with camera 140. Most other power consuming components are used in a similar manner as during Mode 2, however telemetry or data download can be initiated using the STELLA interface 164 through USB connector 118, in Mode 4. During Mode 3, it may be possible to capture longer duration video than during the day, as more power is available when no lights are operating.

Mode 4: Data Transfer. This mode is initiated by processor 128 or by a ground crew command issued through STELLA, to download system data stored within data storage 166. During the USB data transfer, processor 128 can terminate power consuming activities which can be shut off without harming the experiment, and can connect to data storage 166 and request a transfer through the STELLA interface 164. Data storage 166 can be located in whole or in part within processor 128, on a storage device mounted to PCB 110, or within a separate component positioned elsewhere within module 100, or any combination of the foregoing. If needed, Mode 4 can continue throughout the night, transferring to Mode 1 as soon as the time-point of 6 am is reached.

When return to ground commences, module 100 may be unplugged, or depowered, and module 100 returns to Mode 1, as described above. In an embodiment, module 100 is removed from its rack position, and is returned to ground using a landing vehicle. In a further embodiment, having captured all necessary data, module 100 is jettisoned and is destroyed upon reentry.

Figure 10A:
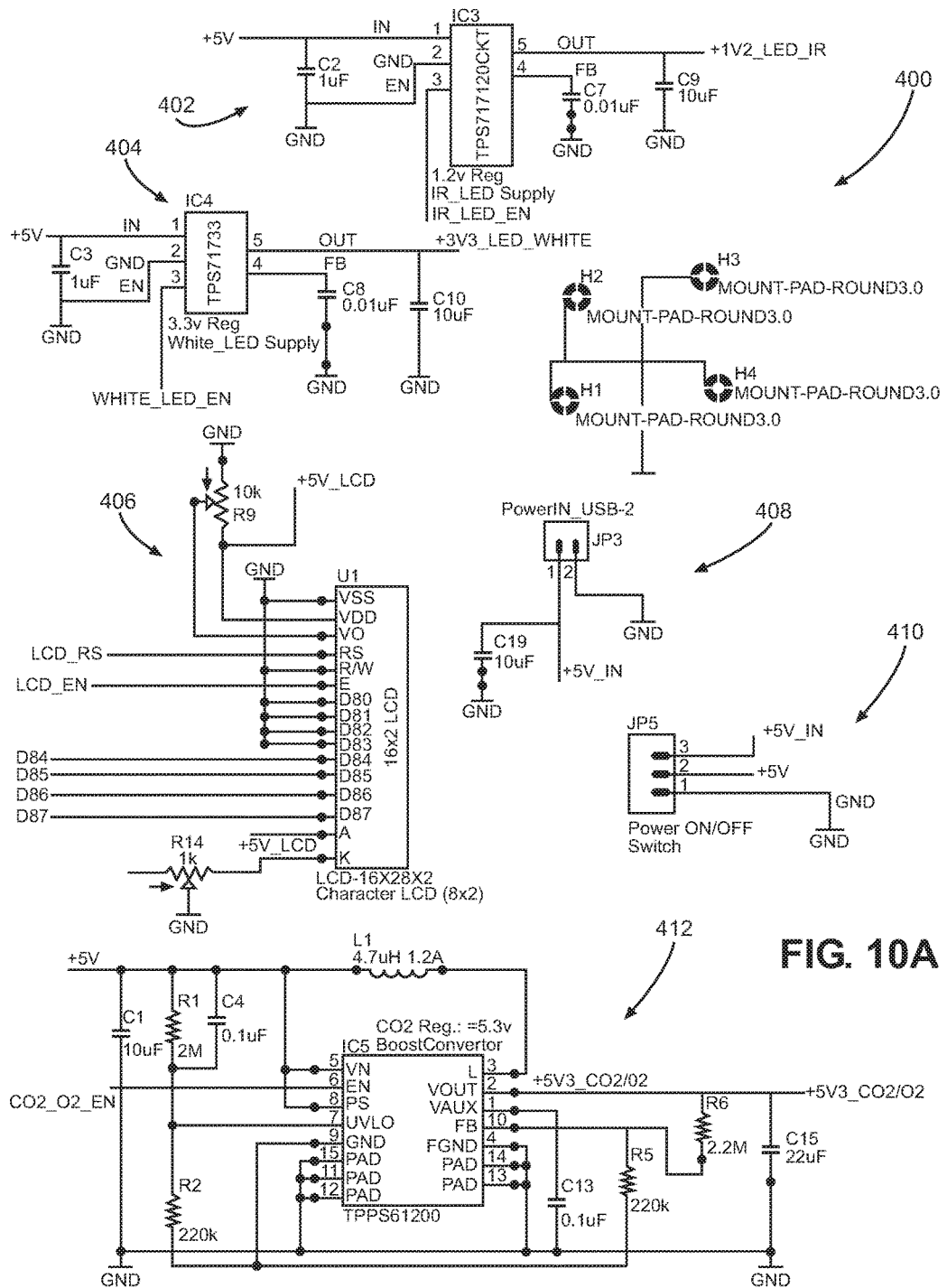
Figure 10B:
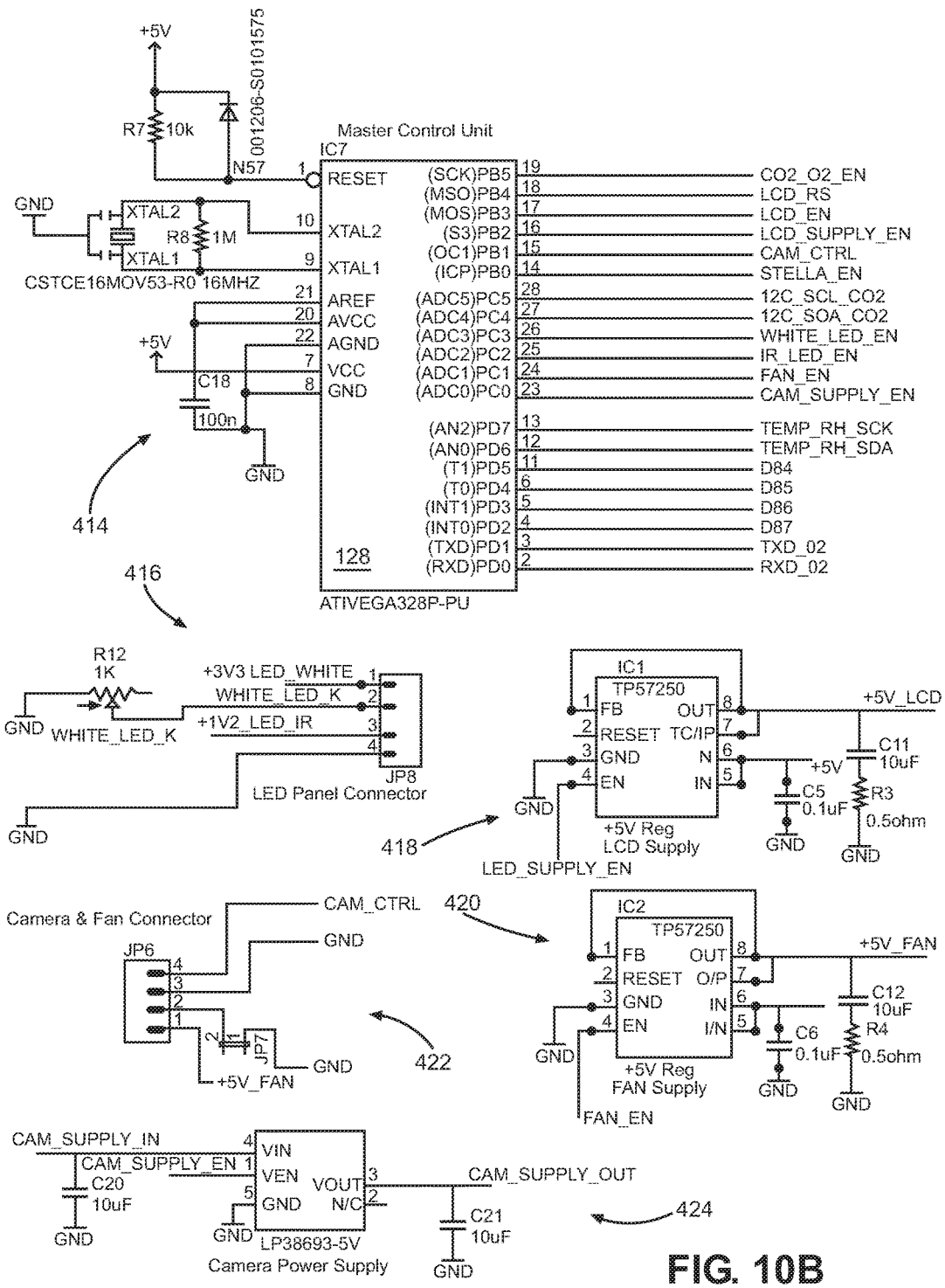
Figure 12:
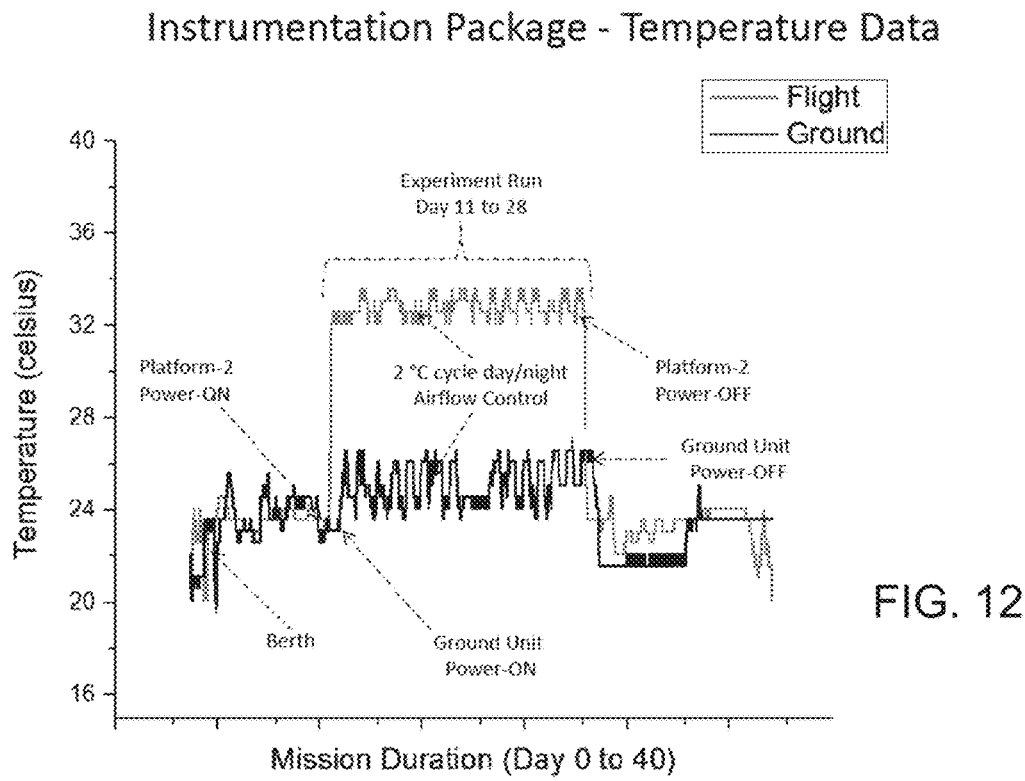
FIG. 12 is a graph of temperature within the modules described with respect to FIG. 11.
Figure 13:
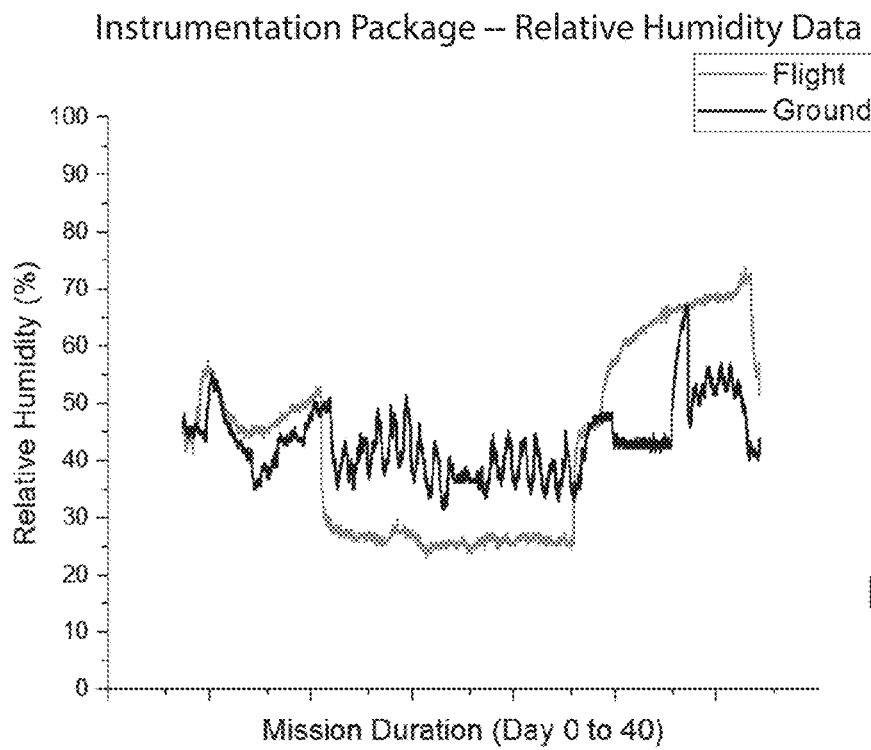
FIG. 13 is a graph of relative humidity within the modules described with respect to FIG. 11.
Figure 14:
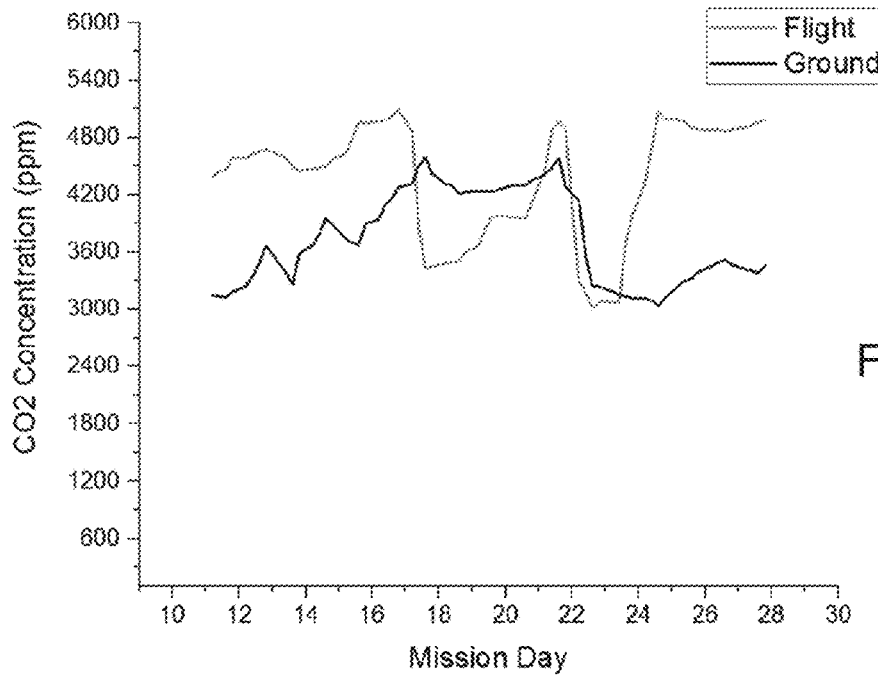
FIG. 14 is a graph of carbon dioxide concentration within the modules described with respect to FIG. 11.
Figure 15:
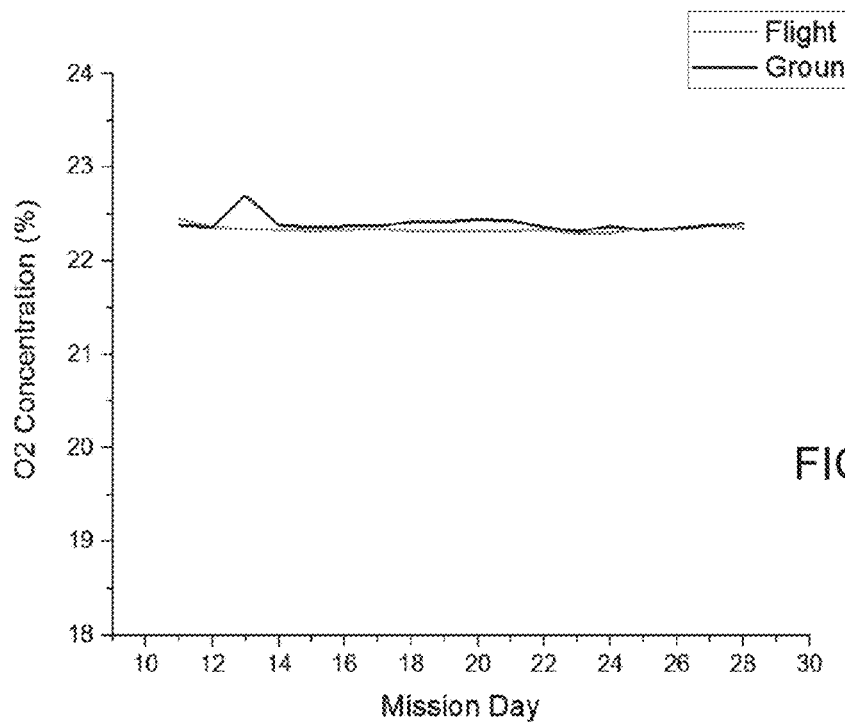
FIG. 15 is a graph of oxygen concentration within the modules described with respect to FIG. 11.

FIGS. 10A-10C depict an embodiment of an electronic circuit 400 including PCB 110. FIG. 10A depicts circuits 402 to power lighting elements 214, and particularly a circuit 402, 404 for each of IR LEDs and white LEDs and LED mounting points; circuit 406 of LCD display 112; circuit 408 for USB connector 116; power switch circuit 410; and circuit 412 for regulating the CO2 sensor. FIG. 10B depicts a master control circuit 414 including processor 128; LED panel circuit 416; LCD 112 and fan 156 power supplies 418 and 420; camera 140 and fan 156 connector 422; and camera 140 power supply 424. FIG. 10C depicts a power supply circuit 426 for STELLA interface 164; and circuit 428 including temperature and humidity sensors 120.

With reference to FIGS. 11-15, module 100 with an experiment as described herein was sent to the ISS on a test mission. An identical module 100 and experiment was also conducted at a ground station. Among other observations, the experiment compared population growth in space and upon the Earth. The modules 100 in the ISS and upon the ground operated for the same length of time.

Table 1 provides data obtained from the ground control module 100. Mutant fly line Indy was placed in upper chamber 202 and a wild type control fly line $w^{1118}$ was placed in lower chamber 204, for each of two modules 100, one which remained on the ground, and one which flew aboard the ISS. The data was obtained from telemetry from both modules, and collected on an encrypted USB drive on the ground. As can be seen from the data, each module contained live flies at all stages of development at the conclusion of the mission. Module 100 was designated PRL Level 9, as having successfully been used in flight, and being qualified for future space flight.

FIG. 11 depicts a timetable of events for the flight and ground modules 100, including loading food; flies by L-50 Hrs; an extended wait for launch; berth with the ISS; successful telemetry 8 and 9 days after launch; a power cycle demonstrating autonomy at 10 and 11 days after launch; and a series of successful telemetry exchanges until a return to ground 24 days after launch.

FIGS. 12-15 illustrate telemetry data for temperature, relative humidity, carbon dioxide concentration, and oxygen concentration, respectively, for both the ground and flight modules 100. The data can be compared with the population at all stages of the experiment, to compare the effects of environment, and to extrapolate possible changes in growth due to low gravity, and other influences due to life in orbit.

It should be understood that the configuration shown and described, and in particular the habitat 200 configuration, should be understood to be one example of a science experiment, and that module 100 can be reconfigured for a great variety of studies. For example, mirror 150 can be arranged in a different location, or a plurality of mirrors can be used. Habitat 200 can have a different shape, or can be configured to contain water for the study of aquatic species. Lighting elements 214 having different wavelengths than as described herein can be used. Different sensors 120 than as described herein can be used.

Module 100 can further be provided with additional elements, such as a heating or cooling device, for example a Peltier device (not shown), which can be used to create a microclimate that is different than within the ISS, generally. Insulation can be provided to help maintain such an environment with a reduced energy requirement. Filters and pumps can additionally be provided for circulating and processing gases or fluids.

The Master Control Unit, which can include parts or all of the components upon PCB 110, including processor 128, or other PCB's within module 100, can be programmed to carry out tasks which differ from those described for the fly experiment herein. However, in accordance with the disclosure, circadian or other life cycle rhythms can be exploited for biological experiments to avoid excessive power requirements, as described herein. Alternatively, for other experiments on living or non-living samples, where a regular alternating pattern of light and dark are not needed, power consumption among the various consumers within module 100 can be scheduled to be serially engaged, as described herein, while maintaining the goals of the experiment. Table 2 includes engineering specifications for the fly habitat shown and described herein; however, in accordance with the foregoing, it should be understood that differing science experiments will deviate from the specifications in Table 2, accordingly.

TABLE 1

Population Data of Ground Module 100

| | | Ground | |
| --- | --- | --- | --- |
| | | $w^{1118}$ | Indy |
| live adults | Male | 11 | 11 |
| | Female | 13 | 21 |
| dead adults | Male | many | many |
| | female | many | many |
| pupae | Live | 60-80 | 60-80 |
| | Dead | few | few |
| | eclosed | >100 | >100 |
| larvae | 3$^{rd}$ instar | 17 | 9 |
| | 2$^{nd}$ instar | 20-30 | 10-20 |
| | 1$^{st}$ instar | 30-40 | 20-30 |
| Embryos | | many | many |

TABLE 2

Engineering Specifications

| Parameter | Value | Unit |
| --- | --- | --- |
| Dimensions | 100 × 100 × 150 | mm |
| Mass | 1430 | grams |
| Power | 3.2 | Watts |
| Operational Voltage | 5.0 | Volts |
| Current Consumption | 640 | mA |
| Air Circulation/Cooling | Fan with 10.2 CFM | CFM |
| Active Sensors | Temperature, Relative Humidity, Carbon dioxide, Oxygen | Celsius, Percentage, ppm, Percentage |
| Passive Sensors | Temperature, Relative Humidity | Celsius, Percentage |

TABLE 2-continued

Engineering Specifications

| Parameter | Value | Unit |
|---|---|---|
| Circadian Cycle | White and Infrared LEDs | N/A |
| Data Storage | 128 | Giga Bytes |
| Video resolution | 1080 | pixels |
| Video rate | 60 | fps |
| Hardware Interface | Universal Serial Bus | N/A |
| Hardware Operational Temperature | −20 to +55 | Celsius |

Table 3 describes peripheral equipment that is used by module 100 as described herein.

TABLE 3

Peripheral Equipment

| Equipment |
|---|
| ISS locker (Nanoracks or similar) for mechanical interface |
| ISS locker (Nanoracks or similar) with external power supply for electrical interface |
| STELLA Channel |
| USB Interface |
| Express Rack Laptop Computer at ISS (optional depending on level of autonomy of experiment) |

To maintain module 100, it is advantageous to inspect the module when placed in the rack, and during operation, for mechanical soundness, electrical connection integrity, state of operation, and battery checks, if present. It is expected that the life of the components far exceeds the mission timespan. Reliability of module 100 was proven in flight.

Specific components used in the test flight are detailed in Table 4.

TABLE 4

Configuration for Test Flight

| | |
|---|---|
| Dimensions (1.5U) | 100 × 100 × 150 mm |
| Stowage Dimensions | 130 × 100 × 150 mm |
| Mass | 1.4 kg |
| Fruit-fly Habitat | 40 × 95 × 50 mm |
| Air Circulation/Cooling | Fan |
| Passive Hobo (iButton) | Temp. and RH measurements, from turn-over (KSC-Start) to return/post-splashdown (ARC-Stop) |
| Camera | GoPro Hero 3 (1080 p @ 60 fps) |
| Lights | White LEDs, Infrared LEDs (Night Vision) |
| Active Sensors | Temperature, Relative Humidity, Carbon Dioxide (CO2), Oxygen (O2) |
| Microphone | Mono electret condenser |
| Data Storage/Transfer | 128 GB (MicroSD) 6 × 8 mm, USB-SBC-STELLA |

Accordingly, the disclosure provides a compact modular enclosure for performing science experiments on small living biological samples such as insects, plants, and other samples and includes the automated capability for video imaging, circadian lighting, air circulation, data storage, data download, communication and sensors to capture environmental data. It is intended to be used both on the International Space Station and on the ground.

The disclosure further provides a suitable experiment platform for science studies of small model organisms or other samples where video and environmental data are required on board the International Space Station (ISS), and particularly where video and environmental data are required on the ground. Video can be captured in high definition format, and can be either transmitted back to ground or stored onboard for future analysis with user software The disclosure further provides required instrumentation for environmental monitoring within the module, and storing and communicating data through telemetry, inclusive of sensing temperature in degree Celsius, relative humidity in percentage, carbon dioxide in parts per million and oxygen in percentage format.

The disclosure further provides video monitoring features constrained under an ISS locker power supply limitation of as low as 2.5 Watts through a USB connection, which functions therefore for both all power requirements and telemetry.

The disclosure additionally provides for circadian light cycling to organism with ultra-low power, light emitting diode technology. White LEDs can be used which emit a mix of spectra which appear white, or which best approximate sunlight.

The disclosure exploits a slot size of existing ISS rack systems, such as Nanoracks, which were, prior to the disclosure, considered too small for conducting many experiments, but which can now be better utilized in light of the disclosure.

The disclosure includes software which can be customized for operations and control of system peripherals within module 100, and includes protocol software for communication of module 100 with STELLA for ground command, control and data transfer on board the ISS.

Live environmental parameters, including for example temperature, relative humidity, carbon dioxide, and oxygen, can be displayed upon an output display, for example a liquid crystal display (LCD) or similar low power display, within a camera-video field of view. Thus, this information is stored with the video, or is received together with the video during telemetry using STELLA or other long range protocol. The Master Control Unit can be reprogrammed to display any desired information upon the LCD, according to the needs of a specific experiment.

In the example embodiment which withstood flight, the software loaded into the Master Control Unit micro-controller was written in embedded C and was developed specifically for the 'AFEx' Ames Fruit Fly Experiment. The software can be written in other languages and is adaptable to other experiments.

By encapsulating the scientific experiment within a robust housing with internal bracing, the disclosure provides a module which can withstand the vibrations and shocks associated with launch, landing and transportation.

The disclosure thus requires very little crew time on the ISS. The experiment can be started by simply inserting the USB cable within the racking system, and can end when the module 100 is disconnected, except for internal environmental monitoring during transit.

Module 100 can easily be installed in any of the ISS racks that accept the standard 10×10×15 cm module size, such as Nanoracks. While upon the rack, and during flight, module 100 accumulates data in flash memory in addition to transmitting data through the ISS telemetry system to the ground on demand. Module 100 can further be duplicated at ground locations for experiment controls. Module 100 is capable of automatically performing life science or other science experiments on model organisms or other samples requiring video and environmental data. The model organisms can be, but are not limited to, insects and plants. As described herein, module 100 forms a Compact Science Experiment Module, and is extremely adaptable to other model specimens and samples.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

| List of Reference Numerals: | | |
|---|---|---|
| 100 | | module |
| | 102 | housing |
| | 104 | lower panel |
| | 106 | back panel |
| | 108 | side panel |
| | 110 | PCB |
| | 112 | LCD display |
| | 114 | USB cable |
| | 116 | USB interface |
| | 118 | USB to ISS |
| | 120 | sensors |
| | 122 | CO2 sensor |
| | 124 | O2 sensor |
| | 126 | iButton device |
| | 128 | processor |
| | 130 | front panel |
| | 132 | top panel |
| | 140 | camera |
| | 142 | camera lens |
| | 150 | mirror |
| | 152 | power switch |
| | 154 | housing brace |
| | 156 | fan |
| | 160 | sensor circuit |
| | 162 | regulator circuit |
| | 164 | STELLA interface |
| | 166 | data storage |
| 200 | | habitat |
| | 202 | upper chamber |
| | 204 | lower chamber |
| | 206 | portal |
| | 210 | feed media |
| | 214 | lighting elements |
| | 244 | front view |
| | 246 | side view |
| | 258 | diffuser |
| | 260 | opaque panel |
| 300 | | living test subject |

The invention claimed is:

1. A device for conducting scientific experiments in space, comprising:
   a housing having dimensions of about 100×100×150 mm or smaller, the housing containing:
   an electronic processor;
   at least one chamber for containing one or more of at least one of a living or non-living subject of the experiment, the chamber having a first side and an adjacent second side;
   a fan controllable by the electronic processor;
   a mirror; and
   a camera controllable by the electronic processor, the camera including a lens oriented to directly view both the chamber first side and the mirror, the mirror oriented to reflect the chamber second side to the lens.

2. The device of claim 1, wherein the mirror is positioned at about a 45 degree angle with respect to the chamber second side.

3. The device of claim 1, whereby images recorded by the camera depict movement of the subject within the at least one chamber along an x-y axis in stored images of the first side, and along a z axis in stored images of the second side, whereby the stored images of the first and second sides can be processed to determine 3 dimensional movements of the subject.

4. The device of claim 1, wherein the at least one chamber and the camera are positioned at opposite ends of the longest dimension of the interior of the housing.

5. The device of claim 1, wherein the processor, fan, and camera operate using 5 volt power derived from a USB connection.

6. The device of claim 1, further including lights which emulate daylight and lights which emit infrared light, the lights controlled by the processor to illuminate an interior of the chamber in a circadian pattern emulating day and night.

7. The device of claim 6, wherein the housing further includes a circuit configured for transmitting data through a STELLA interface, and wherein the scientific experiment is carried out using about 5 W or less by powering the STELLA interface, camera, lights, fan, and sensors singly or in groups, as controlled by the processor.

8. The device of claim 6, wherein the lights, fan, and camera operated simultaneously consume more than a maximum amount of power available, and are controlled by the processor individually or in groups to maintain a total power consumption within the amount of power available.

9. The device of claim 8, wherein there is no source of power storage within the housing.

10. The device of claim 8, wherein the infrared lights use less power than the daylight lights, and wherein the camera is operated longer during the night portion of the circadian pattern, the processor controlling the IR lights to illuminate only during use of the camera.

11. The device of claim 1, wherein the device has an overall dimension of 1.5 U.

12. The device of claim 1, further including a STELLA communications interface connected to the processor.

13. The device of claim 1, further including a plurality of sensors electronically connected to the processor and configured to measure parameters inside the housing including at least one of temperature, oxygen saturation, and carbon dioxide saturation, and to provide sensor data pertaining to the measured parameters through the electronic connection to the processor.

14. The device of claim 13, wherein the fan is controlled by the processor based on the sensor data.

15. The device of claim 1, wherein surfaces inside the housing are covered with a non-reflective material.

16. A method for conducting scientific experiments in space, comprising:
   providing a housing having dimensions of about 100×100×150 mm or smaller, the housing containing:
   an electronic processor;
   at least one chamber for containing one or more of at least one of a living or non-living subject of the experiment, the chamber having a first side and an adjacent second side;
   a mirror; and
   a camera controllable by the electronic processor, the camera including a lens oriented to directly view both the chamber first side and the mirror, the mirror oriented to reflect the chamber second side to the lens.

17. The method of claim 16, wherein the housing further includes a STELLA communications interface and a fan controllable by the processor.

18. The method of claim 16, wherein the housing further includes lights which emulate daylight and lights which emit infrared light, the lights controlled by the processor to illuminate an interior of the chamber in a circadian pattern emulating day and night.

19. The method of claim 18, wherein the infrared lights use less power than the daylight lights, and wherein the camera is operated longer during the night portion of the circadian pattern, the processor controlling the IR lights to illuminate only during use of the camera.

20. A device for conducting scientific experiments in a space vehicle, comprising:
   a housing having dimensions of about 100×100×150 mm or smaller, the housing containing:
   an electronic processor;
   at least one chamber for containing one or more of at least one of a living or non-living subject of the experiment, the chamber having a first side and an adjacent second side;
   a fan controllable by the electronic processor;
   a plurality of sensors operative to communicate data pertaining to the environment within the housing to the processor;
   a STELLA interface connected to the processor and a communications system of the space vehicle, for transmitting data away from the space vehicle and back to the space vehicle;
   a mirror; and
   a camera controllable by the electronic processor, the camera including a lens oriented to directly view both the chamber first side and the mirror, the mirror oriented to reflect the chamber second side to the lens.

* * * * *